US012665905B2

(12) United States Patent
Huang

(10) Patent No.: US 12,665,905 B2
(45) Date of Patent: Jun. 23, 2026

(54) INCREMENTAL MICRO-SEGMENTATION SYSTEM AND INCREMENTAL MICRO-SEGMENTATION METHOD

(71) Applicant: TXONE NETWORKS INC., Hsinchu City (TW)

(72) Inventor: Hung-Sheng Huang, Hsinchu City (TW)

(73) Assignee: TXONE NETWORKS INC., Hsinchu City (TW)

( * ) Notice: Subject to any disclaimer, the term of this patent is extended or adjusted under 35 U.S.C. 154(b) by 64 days.

(21) Appl. No.: 18/768,811

(22) Filed: Jul. 10, 2024

(65) Prior Publication Data

US 2026/0019421 A1      Jan. 15, 2026

(51) Int. Cl.
*H04L 29/06* (2006.01)
*H04L 9/40* (2022.01)

(52) U.S. Cl.
CPC ............ *H04L 63/101* (2013.01); *H04L 63/20* (2013.01)

(58) Field of Classification Search
CPC ..... H04L 63/10; H04L 63/20; H04L 63/0227; H04L 63/14; H04L 63/108; H04L 63/0263
See application file for complete search history.

(56) References Cited

U.S. PATENT DOCUMENTS 8,006,088 B2 * 8/2011 Peretti .................... H04L 63/10
                                                    726/17
10,778,721 B1    9/2020 Holbrook et al.
11,968,241 B1 *  4/2024 Kjelstrup ............... G06N 20/00
2020/0412763 A1 * 12/2020 Mercian ................ H04L 63/101
2024/0223618 A1   7/2024 Kjelstrup et al.

FOREIGN PATENT DOCUMENTS

WO      WO-2023192215 A1 * 10/2023 ......... G06Q 10/0635

OTHER PUBLICATIONS

Search Report dated Oct. 28, 2024 of the corresponding European patent application No. 24188726.4.

* cited by examiner

*Primary Examiner* — Longbit Chai
(74) *Attorney, Agent, or Firm* — HDLS IPR SERVICES; Chun-Ming Shih

(57) ABSTRACT

An incremental micro-segmentation system includes a shared network and a network control device. The network control device is configured to perform operations of: retrieving multiple key values from a network flow; adding the multiple key values to be a policy rule of a temporary policy group based on an interested attribute of the temporary policy group of a candidate policy group set; computing a group score of each temporary policy group according to a recommended factor; when determining that the group score is greater than a threshold, generating a recommendation set including the temporary policy groups; and deploying the recommendation set to an access control list to make the temporary policy groups be enforced.

16 Claims, 6 Drawing Sheets

| Rule name | Clint IP | Server IP | Sesrvice | (vlan/user/...) | Action |
|---|---|---|---|---|---|
| custom01 | 10.0.0.1 | any | 3389(rdp) | ... | allow |
| custom02 | any | any | 3389(rdp) | ... | deny |
| 10.0.1.1 Forbid New Client | | | ... | | |
| Forbid New Service | any | any | 22(ssh) | ... | allow |
| | any | any | 80(http) | ... | allow |
| | any | any | any | ... | deny |
| default | | | | | allow |

| Rule name | Clint IP | Server IP | Sesrvice | (vlan/user/...) | Action |
|-----------|----------|-----------|----------|-----------------|--------|
| custom01 | 10.0.0.1 | any | 3389(rdp) | ... | allow |
| custom02 | any | any | 3389(rdp) | ... | deny |
| 10.0.1.1 Forbid New SSH Client | 10.0.2.2 | 10.0.1.1 | 22(ssh) | ... | allow |
| | | | ... | | |
| | any | 10.0.1.1 | 22(ssh) | ... | deny |
| 10.0.1.1 Forbid New Client | | | ... | | |
| Forbid New Service | | | ... | | |
| default | | | | | allow |

INCREMENTAL MICRO-SEGMENTATION SYSTEM AND INCREMENTAL MICRO-SEGMENTATION METHOD

BACKGROUND OF THE DISCLOSURE

Technical Field

The disclosure relates to a system for monitoring a network flow and a network flow monitoring method, and more particularly, to an incremental micro-segmentation system and an incremental micro-segmentation method.

Description of Related Art

Generally, the information management personnel separates device usage rights based on user permission levels. To manage access rights in the network, the information management personnel sets an access permission of each device in the network. In addition to individually setting the access permission of each device, the information management personnel must also handle exceptions of the access permission. Such a permission management mechanism is inefficient and it is hard to implement flexible permissions management.

On the other hand, the information management personnel can manage the network flows by creating access control lists (ACLs) in firewalls and manually setting access rules of the ACLs. For example, the information management personnel can set multiple allowed-access policy rules in the ACLs according to the order of rules, and set the last rule as a denied-access policy rule. The firewall uses the allowed-access policy rules and denied-access policy rule of the ACLs to control network flow, achieving the effect of allowing or blocking access. However, the manual setting of ACLs relies on the experience of the information management personnel, and it results in an unstable quality of entire network permission management. Moreover, to set each allowed and denied-access policy rule, the information management personnel spends a significant amount of time observing network behavior, and it also results in inefficient network permission management. Furthermore, the information management personnel sets policy rules of the ACLs of the firewall based on the order from top to bottom. Once the ACL is activated in the firewall, it is hard for the information management personnel to adjust the network flow permissions because the adjustment can only be made by updating the entire ACL, which is an inflexible mechanism.

Therefore, finding an automatic, efficient, and flexible permissions management for network flow is a major issue in the field of network monitoring.

SUMMARY OF THE DISCLOSURE

One of the exemplary embodiments is to provide an incremental micro-segmentation system including a shared network and a network control device. Multiple network assets are deployed in the shared network. The network control device is authorized to monitor the shared network and to perform in a learning stage parallel to a generating stage and a deployment stage. The network control device is configured to: retrieve multiple key values from a network flow in the learning stage; based on an interested attribute of one or multiple temporary policy groups of a candidate policy group set that is not enforced, add the multiple key values to be a policy rule of the temporary policy group;

compute a group score of each of the temporary policy groups according to a recommended factor; when determining that the group score is greater than a threshold, generate a recommendation set comprising the temporary policy groups in the generation stage; and deploy the recommendation set to an access control list in the deployment stage to make content of the temporary policy groups be enforced.

One of the exemplary embodiments is to provide an incremental micro-segmentation method, performed by a network control device authorized to monitor a shared network, where the network control device performs in a learning stage parallel to a generation stage and a deployment stage. The incremental micro-segmentation method includes steps of: retrieving multiple key values from a network flow in the learning stage; based on an interested attribute of one or multiple temporary policy groups of a candidate policy group set that is not enforced, adding the multiple key values to be a policy rule of the temporary policy group; computing a group score of each of the temporary policy groups according to a recommended factor; when determining that the group score is greater than a threshold, generating a recommendation set comprising the temporary policy groups in the generation stage; and deploying the recommendation set to an access control list in the deployment stage to make the content of the temporary policy groups be enforced.

DETAILED DESCRIPTION

Figure 1:
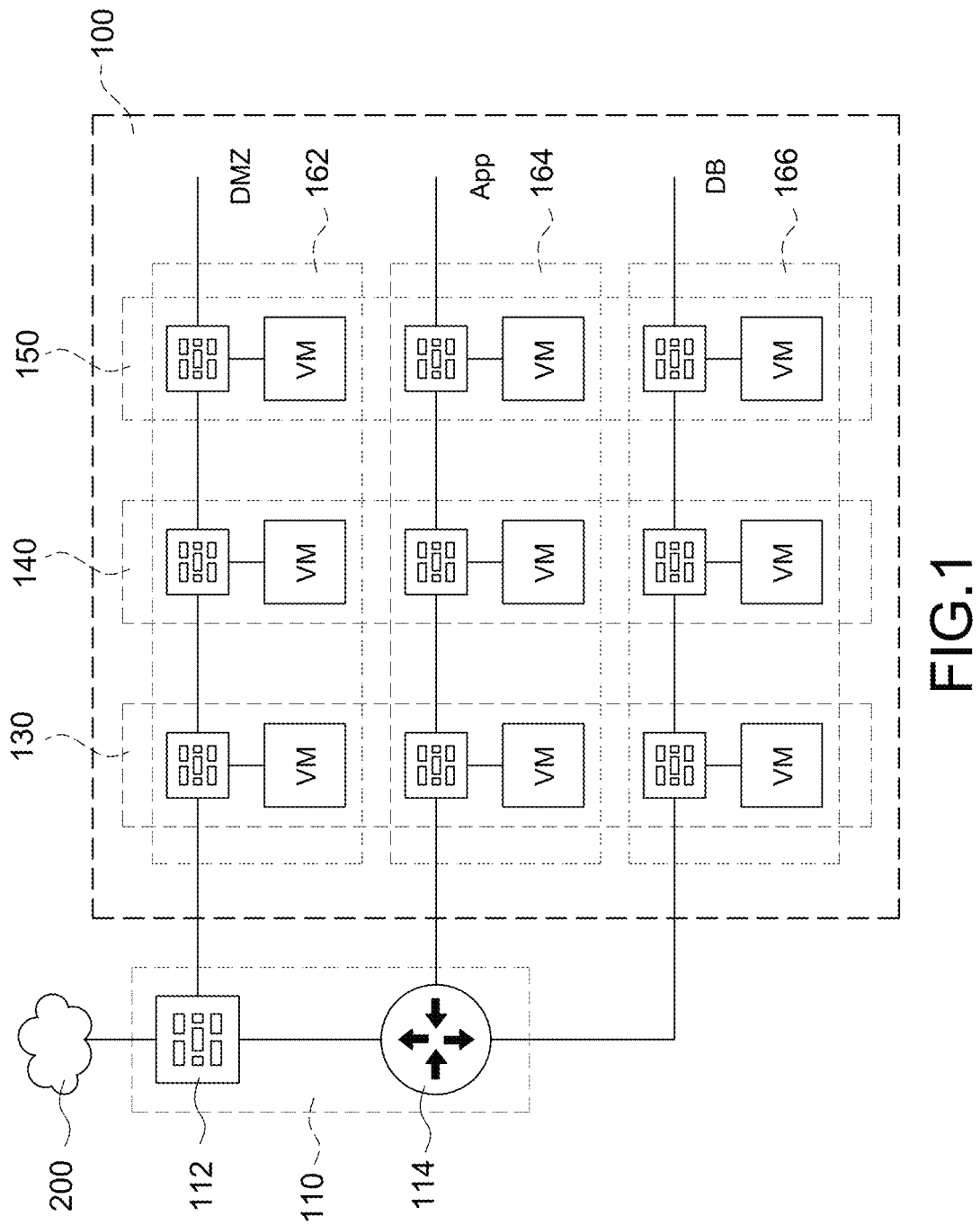
FIG. 1 is a schematic diagram illustrating a shared network deploying multiple assets according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

In general, the information management personnel set the same network segment for the devices of the same department, such that the devices of the same department exchange data with each other. Furthermore, the information management personnel set access authorities to the devices in different departments for controlling the permission boundaries of the Intranet.

In the disclosure, the dynamic micro-segmentation techniques may be applied to an enterprise Intranet or to a shared network deploying multiple network assets, without diving the network communication into different network segments, and allow network flows if they are authorized or block network flows if they are not, in order to achieve automatic network security management and security section protection.

FIG. 1 is a schematic diagram illustrating a shared network deploying multiple assets according to one embodiment of the disclosure.

In FIG. 1, the enterprise includes the Finance Department 130, the Human Resource Department 140, and the Engineering Department 150, for example. Multiple network assets are allocated to each department, and the network assets of each department are disposed in the shared network 100 of the enterprise Intranet, connecting and exchanging data in the shared network 100.

Generally, the information management personnel make the network segmentation based on the departments of the enterprise, to achieve the authorization management of the network devices. For example, the devices of the Finance Department 130 can only access their own network assets and are forbidden to access the network assets of the Human Resource Department 140. In the disclosure of the dynamic micro-segmentation techniques, the devices of the Finance Department 130, the Human Resource Department 140, and the Engineering Department 150 may possess suitable authority to access the network devices of other departments.

In one embodiment, the network assets may be electronic devices communicating through the Internet protocol in the shared network 100, such as a server, a personal computer, a cloud device, or a virtual machine. For the sake of understanding, a demilitarized zone (DMZ) device 162, an App service device 164, and a database (DB) 166 are taken as an example of the network assets. As an example, the DMZ device 162 is a server that is disposed in the shared network 100 and the Internet 200 is permitted to access through.

The application scenario of FIG. 1 utilizes a virtual machine to implement the security management of each department in the shared network 100. It should be noted that utilization is not limited to a virtual machine, and any entity having a firewall function may be applied.

In one embodiment, the shared network 100 is the enterprise Intranet.

In the embodiment of FIG. 1, before the network flow of the Internet 200 goes inside the shared network 100, it passes through a firewall 112 and a gateway 114. In the other embodiment, the firewall 112 and the gateway 114 can be replaced with a gateway integrated into a firewall. For the sake of description, the firewall 112 and the gateway 114 are called a network control device 110.

In one embodiment, the network control device 110 may monitor the network flows inside the shared network 100, coming from the Internet 200 into the shared network 100, and passing from the shared network 100 to the Internet 200.

In one embodiment, the network control device 110 analyzes the network flow to obtain information carried by the network flow. For example, the information may be a service, a port number, a virtual local area network (VLAN), or a piece of user information, the network control device 110 analyzes a header of a packet to obtain a source IP address, a destination IP address, a packet type, and the information on the network flow.

The network flow carries key values that are essential information for the network assets to communicate with other network assets or communication devices in the communication network. The key values may be a protocol stack feature, such as the service, the port number, the source IP address, the destination IP address, and the packet type. The network control device 110 may retrieve one or multiple key values from the network flow.

The network control device 110 stores an access control list (ACL). The ACL includes one or multiple policy groups, and each policy group stores multiple policy rules. Different combinations of the multiple key values form different policy rules. The network control device 110 applies these policy rules to allow or block the network flow.

In one embodiment, the network control device 110 allocates a buffer or a memory block to store a candidate policy group set. The candidate policy group set includes a temporary policy group that has not enforced yet. The candidate policy group set is temporary information established by the network control device 110 while the network control device 110 observes and learns the network behavior. Each temporary policy group includes the policy rules. Before the network control device 110 makes the policy rules enforced, the policy rules corresponding to the temporary policy group are stored in the memory until the learning process of the temporary policy group is finished, and then the temporary policy group is moved to the ACL for formally filtering the network flows.

An embodiment from establishing the candidate policy group set to enforcing the temporary policy group is provided below. The network control device 110 retrieves one or multiple key values from the network flow. Based on an interested attribute of one or multiple temporary policy groups that are not enforced, the network control device 110 adds the multiple key values to be a policy rule of the temporary policy group correspondingly. That is, the network control device 110 takes the combination of the key values as one learned policy rule and updates the learned policy rule to the temporary policy group of the candidate policy group set. The network control device 110 computes a group score of each temporary policy group according to a group state of each temporary policy group. When the group score of one or some temporary policy group(s) is greater than a threshold, the network control device 110 generates a recommendation set including the temporary policy group. After optimizing the temporary policy group of the recommendation set, the network control device 110 deploys the contents of the recommendation set to the ACL to enforce the temporary policy group.

In one embodiment, before the ACL is well-defined, the network control device 110 learns the information carried by the network flow in the learning stage, such as the information of the access device (a client or a server), the communication protocol, and the service, and updates the candidate policy group set (including multiple policy groups). The network control device 110 selects one or multiple temporary policy groups from the candidate policy group set according to a condition to generate the recommendation set in a generating stage and makes all the recommendation policy groups of the recommendation set enforced in the ACL (detailed in FIG. 3).

Figure 2:
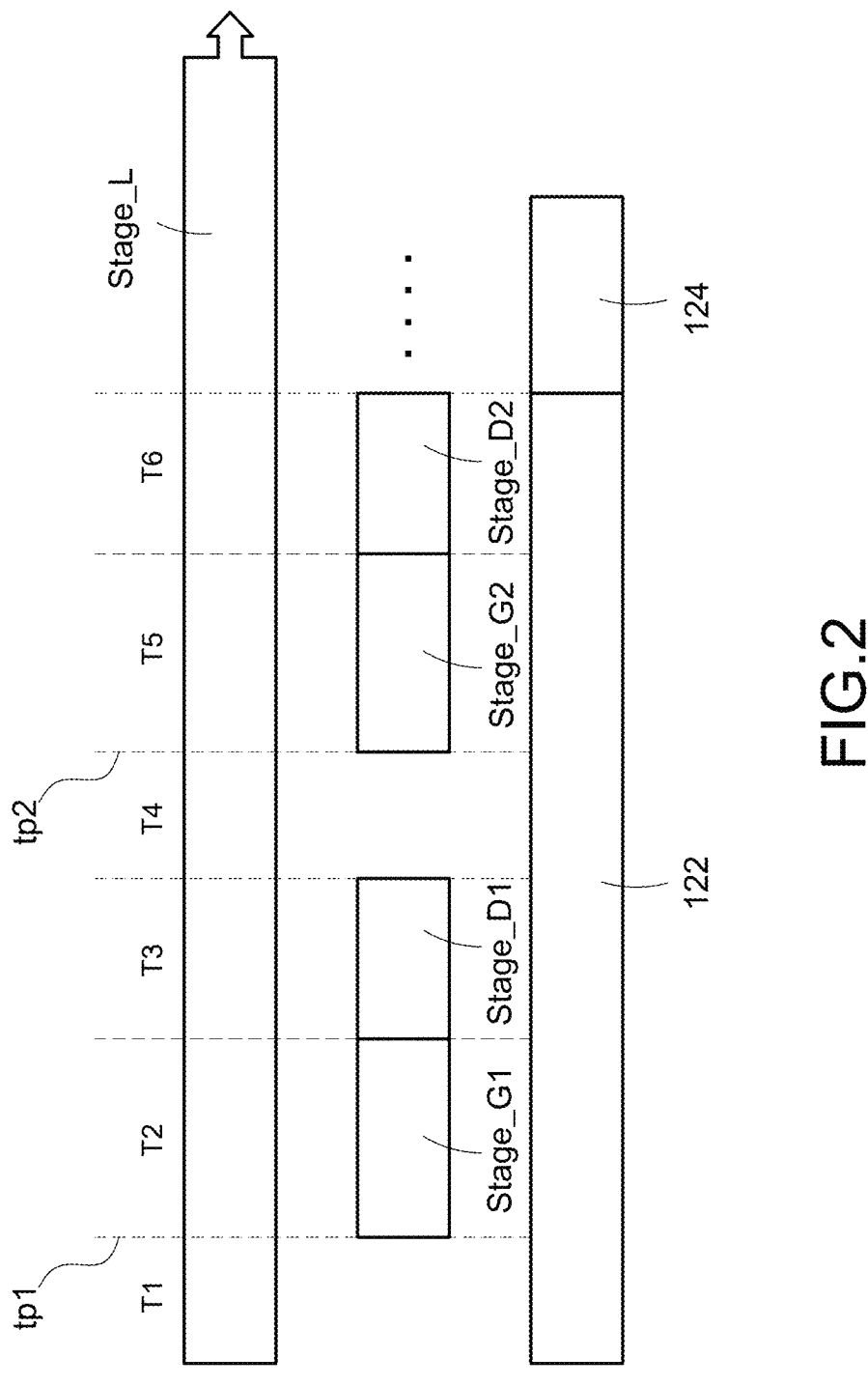
FIG. 2 is a time sequence diagram illustrating a network control device performing an incremental micro-segmentation method according to one embodiment of the disclosure.

Reference is made to FIG. 2. FIG. 2 is a time sequence diagram illustrating the network control device performing an incremental micro-segmentation method according to one embodiment of the disclosure.

The network control device 110 continuously monitors all the network flows in the shared network 100 without any disruption in the learning stage Stage_L, updates the candidate policy group set by using the multiple key values retrieved from the network flow, generates the recommendation set by using the candidate policy group and optimizes the ACL in the generation stage Stage_G1, and deploys the updated ACL in the deployment stage Stage_D1.

In the time sequence, the generation stage Stage_G1, the deployment stage Stage_D1, the generation stage Stage_G2, the deployment stage Stage_D2, and the like, are stages performed one by one. The learning stage Stage_L is parallel to the generation stage Stage_G1 and the deployment stage Stage_D1. Specifically, the network control device 110 executes only the learning stage Stage_L during Time T1. When the network control device 110 determines that a trigger condition is satisfied at time tp1, the network control device 110 does not finish the learning stage Stage_L; instead, the network control device 110 performs a trigger process during Time T2 to enter the generation stage Stage_G1.

In the generation stage Stage_G1, the network control device 110 selects the temporary policy group from the candidate policy group set to generate the recommendation set and optimize the ACL. The recommendation set includes multiple recommendation policy groups (i.e., the group scores of all the recommendation policy groups are greater than the threshold).

Furthermore, the network control device 110 enters the deployment stage Stage_D1 during Time T3 according to another condition. In the deployment stage Stage_D1, the network control device 110 deploys the updated ACL. During Time T4, the network control device 110 may utilize the ACL to filter the network flow even though the ACL is not well-defined. The term "well-defined ACL" means the ACL may filter the network flow with an accuracy of security protection above 90%. In other words, the network control device 110 utilizes the ACL to filter the network flow and continuously collects data in the learning stage Stage_L at the same time.

It should be noted that the network control device 110 does not terminate the learning stage Stage_L during Time T2, Time T3, and Time T4. Besides, the network control device 110 detects the network flow and continuously retrieves data to perform the computation until triggering a process. For example, while the trigger condition is satisfied at time tp2, the network control device 110 does not terminate the learning stage Stage_L; meanwhile, the network control device 110 performs the trigger process during Time T5 to go back to the generation stage Stage_G2 and then performs the deployment stage Stage_D2 during Time T6. Along the same reasoning, the processes of the incremental micro-segmentation method are finished until the network control device 110 determines that the ACL is well-defined.

In the embodiment, the learning stage Stage_L, the generation stage Stage_G1, the deployment stage Stage_D1, the generation stage Stage_G2, the deployment stage Stage_D2, and so on, are referred to collectively as the "micro-segmentation process" 122. If the network control device 110 determines that the full micro-segmentation process is finished in a certain deployment stage Stage_Dn and the micro-segmentation process 122 is no longer needed, the network control device 110 performs a temporary termination process 124 to pause the micro-segmentation process 122. Even though the network control device 110 pauses the micro-segmentation process 122, the network control device 110 still continuously performs the learning stage Stage_L and filters the network flow by the latest ACL.

Figure 3:
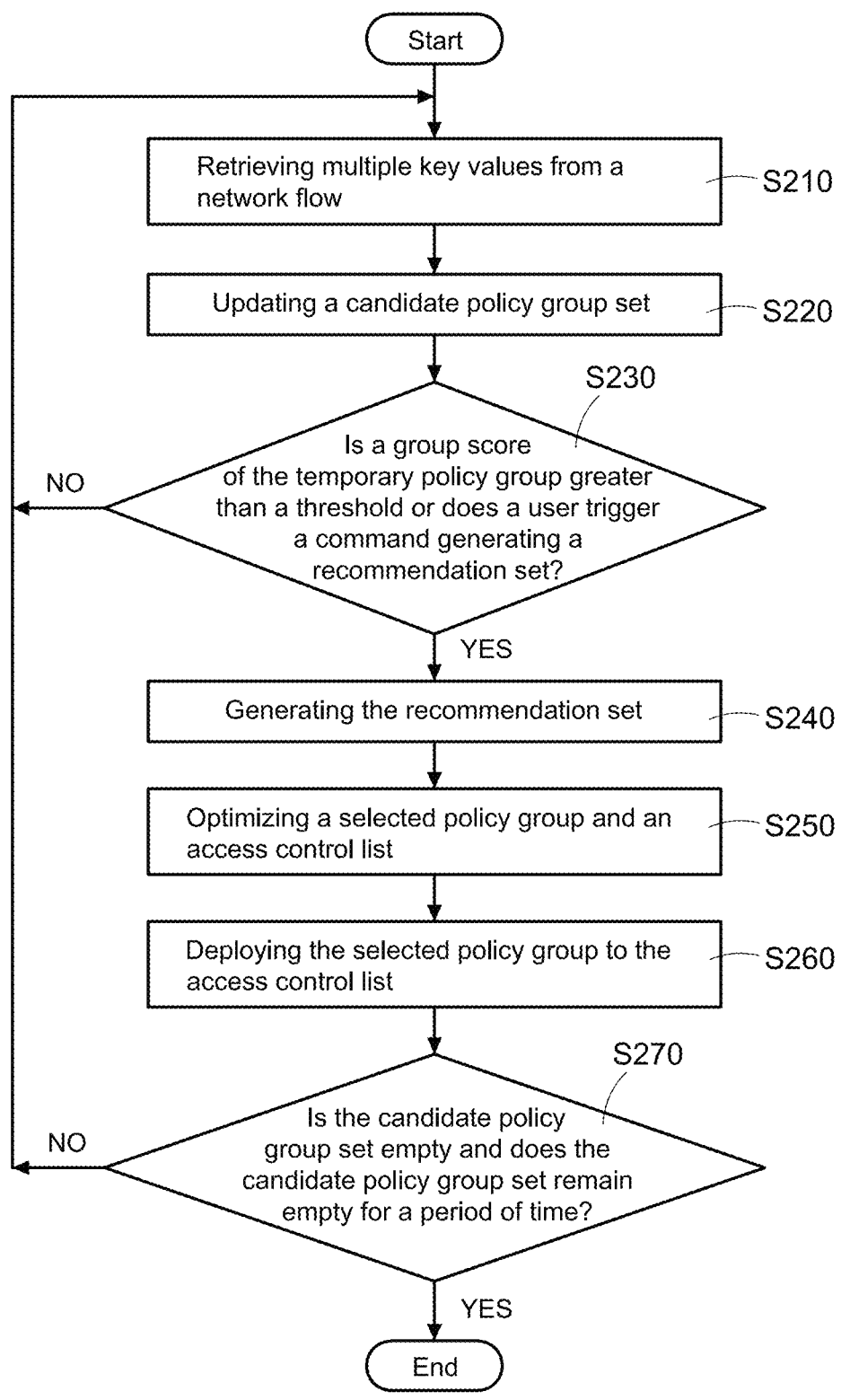
FIG. 3 is a flowchart of the incremental micro-segmentation method according to one embodiment of the disclosure.

The following description is provided and incorporated with FIG. 2 and FIG. 3. FIG. 3 is a flowchart of the incremental micro-segmentation method according to one embodiment of the disclosure. The incremental micro-segmentation method may be performed by the network control device 110 in FIG. 1.

In step S210, retrieving the multiple key values from the network flow is performed.

In step S220, updating the candidate policy group set is performed.

In one embodiment, the network control device 110 continuously monitors all the network flows in the shared network 100 without any disruption in the learning stage Stage_L and updates the candidate policy group set by using the multiple key values retrieved from the network flow.

The candidate policy group set includes one or multiple temporary policy groups. Each temporary policy group is associated with an interested attribute. The interested attribute includes a control attribute and an observation attribute. The control attribute is a constant part of the allowed-access policy rules and denied-access policy rules of the temporary policy group in common, and the observation attribute is an enumerated part of the allowed-access policy rules of the temporary policy group.

The interested attribute may be one of the one or multiple key values of the network flow (e.g., a client, a server, a service, or a port number). The network control device 110 creates the allowed-access policy rule according to the temporary policy group associated with the interested attribute.

The candidate policy group set is stored in the memory of the network control device 110. Before the deployment stage is performed, the temporary policy group(s) of the candidate policy group set is(are) not added to the ACL.

For the sake of understanding the disclosure, an embodiment below is the interested attribute associated with a Networked Attached Storage server, NAS server (herein referred to as "NAS server"), and steps of maintaining the temporary policy group(s) associated with the NAS server in the learning stage Stage_L by the network control device 110 are provided.

Generally, the NAS server is a server that stores data and shared files in a private network, so the network control device 110 does not restrict any source of the client. Because the service provided by the NAS server is about the file sharing service, the data field "service" carries information about which type may be the HyperText Transfer Protocol (HTTP), the File Transfer Protocol (FTP), the Server Message Block (SMB), or the Secure Shell Protocol (SSH).

In the embodiment, the interested attribute is an SSH client list of one of the NAS servers. The control attribute is the SSH service of one of the NAS servers (i.e., the server of the allowed-access and denied-access policy rules is constrained to the SSH server), and the observation attribute is the clients connected with the server. The network control device 110 establishes the temporary policy group whose interested attribute is the NAS server in the candidate policy group set.

In this situation, all SSH network flows to the NAS server are associated with the temporary policy group. The network control device 110 adds an allowed-access policy rule to the temporary policy group according to observed client data, i.e., allow <some specific clients, this NAS server, SSH>, to allow some specific clients to access the NAS server with the SSH server, and adds a denied-access policy rule to the temporary policy group, i.e., deny <any clients, this NAS server, SSH>, to make the said allowed-access policy rule enforced. The temporary policy group (including one allowed-access policy rule and one denied-access policy rule) constraints the clients in only utilizing the SSH service to access the NAS server.

In another embodiment, the network control device 110 regards the service that the service restrained by the temporary policy group for the client to utilize as a constraint condition. For example, the interested attribute is the service of one of the NAS servers, and the observation attribute is the server free to utilize. In this situation, all the network flows toward the NAS server are associated with the temporary policy group. The network control device 110 adds an allowed-access policy rule to the temporary policy group according to observed service, i.e., allow <any clients, this NAS server, HTTP/FTP/SMB/SSH>, to allow all the clients to access the NAS server through the HTTP, the FTP, the SMB, or the SSH, and adds a denied-access policy rule to the temporary policy group according to the control attribute, i.e., deny <any clients, this NAS server, any services>, to make said allowed-access policy rule enforced. The policy group (including an allowed-access policy rule and a denied-access policy rule) constrains all the clients from accessing the NAS server only by utilizing the HTTP, the FTP, the SMB, or the SSH. For example, if the client utilizes the Digital Living Network Alliance (DLNA) service, the network flow is blocked by the policy group, so the client is unable to access the NAS server.

For the sake of understanding the disclosure, another embodiment below is the interested attribute of an Industrial Control System network (herein referred to as "ICS network"), and steps of establishing the policy group associated with the ICS network in the learning stage by the network control device 110 to implement local protection.

The ICS network includes multiple industrial control devices and a server connecting to the industrial control devices, and the industrial control devices start manufacturing or producing procedures after being deployed. The ICS network has the property of the industrial control devices being seldom altered after being stable and starting the routine manufacture or production. In some situations, it is allowable for a new industrial control device of the ICS networks to connect to the server, but it is forbidden for a new server to connect to the ICS networks. Therefore, the network control device 110 has to constrain all the clients only to connect to a specific server (i.e., the working server) and regards it as the constraint condition.

In the embodiment, when the interested attribute is the ICS network, the control attribute is the IP protocol (such as the server IP address and the client IP address), and the observation attribute is the server, all the network flows that are related to the IP protocol are concerned by the temporary policy group. In other words, the network flows that are not related to the IP protocol (such as the ARP or the LLDP) are not concerned. The network control device 110 creates the allowed-access policy rule according to all the services in operation, i.e., allow <any clients, some specific servers, any services>, to allow all devices (including the newly added industrial control device) to connect to the specific server in the ICS network, and adds a denied-access policy rule, i.e., deny <any clients, any servers, any services>, to make said allowed-access policy rule enforced. The temporary policy group (including an allowed-access policy rule and a denied-access policy rule) constrains all the clients to only connect to the specific servers (i.e., the existing servers).

In another embodiment, the network control device 110 regards the service that all clients are allowed to utilize as the constraint condition. For example, when the interested attribute is the ICS network, the control attribute is the IP protocol, and the observation attribute is the service, all the IP protocol flows are associated with the temporary policy group. The network control device 110 creates the allowed-access policy rule according to the service in operation, i.e., allow <any clients, any servers, some specific services>, to allow all the clients to connect to the server with the specific service, and adds the denied-access policy rule, i.e., deny <any clients, any servers, any services>, to make said allowed-access policy rule enforced. The temporary policy group (including an allowed-access policy rule and a denied-access policy rule) constrains all the clients to connect to any server only by the specific services.

In one embodiment, the candidate policy group set includes multiple policy groups, and each policy group is associated with one interested attribute. The candidate policy group set of the two embodiments above includes two temporary policy groups (or called "a first temporary policy group" and "a second temporary policy group"), and the interested attributes are associated with the NAS server and the ICS network respectively. The candidate policy group set is illustrated in TABLE I.

TABLE I

|  |  |
| --- | --- |
| the candidate policy group set | |
| Candidate policy group set | |
| The first temporary policy group | The second temporary policy group |
| Name: | Name: |
|   Forbid New Service |   10.0.1.1 Forbid New Client |
| Polices: | Polices: |
|   <any, any, 22, allow> |   <10.0.0.1, 10.0.1.1, any, allow> |
|   <any, any, any, deny> |   <10.0.0.2, 10.0.1.1, any, allow> |
| Score: |   <any, 10.0.1.1, any, deny> |
|   50 | Score: |
| Factors: |   40 |
|   Last new service seen: | Factors: |
|   20 days |   Last new service seen: |
| |   13 days |

In the learning stable Stage_L, the network control device 110 performs steps S210 and S220 to continuously update the candidate policy group set. It should be noted that the candidate policy group set is not enforced yet, i.e., the temporary policy group of the candidate policy group set is not added to the ACL yet.

In one embodiment, the type of each policy rule of the temporary policy group includes the access control of Layer 4 and Layer 7 of the Open System Interconnection (OSI) Model, the role-based access control, the application-based access control, and the attribute-based access control.

Referring back to FIG. 3, in step S230, determining whether the group score of the temporary policy group is greater than a threshold or a user triggers a command generating a recommendation set.

In one embodiment, the network control device 110 computes the group score of the temporary policy group according to a recommended factor.

In one embodiment, each temporary policy group of the candidate policy group set has the group score. At the initial state, the group score of each temporary policy group is 0. The network control device 110 computes a recommended factor value based on each recommended factor and computes the group score of each temporary policy group based on each recommended factor value.

Detailed recommended factors and recommended factor values are provided below.

The recommended factor includes an update interval of each temporary policy group, a restricted range of each temporary policy group, a confidential or sensitive level of each temporary policy group, or the temporary policy group involved in management services, out-of-date services, or services with vulnerabilities.

In one embodiment, when the recommended factor is the update interval of the temporary policy group, the network control device 110 computes the recommended factor value according to the update interval.

For example, the longer the update interval of the temporary policy group, the higher the recommended factor value is. If the first temporary policy group has not been updated for 7 days, i.e., the last time the first temporary policy group being updated is 7 days ago, the recommended factor value is 0.5. If the second temporary policy group has not been updated for 3 days, i.e., the last time the second temporary policy group being updated is 3 days ago, the recommended factor value is 0.1.

In one embodiment, the network control device 110 uses a grade table recording updating days and values to obtain the recommended factor value, though, it is not limited thereto.

In one embodiment, when the recommended factor is the restricted range of the temporary policy group, the network control device 110 computes the recommended factor value according to the restricted range.

For example, if the restricted range of the temporary policy group becomes smaller, the network control device 110 increases the recommended factor value of the temporary policy group. In one embodiment, the restricted range is associated with the quantity of the multiple key values of the temporary policy group that are enumerated as the control attributes. The more the control attributes, the smaller the restricted range is. That is, more network flows are outside the restriction rule. The less the control attributes, the larger the restricted range is. It should be noted that the restricted range indicates an access scale of the entire network affected by the temporary policy group. The smaller the network flow is allowed to pass through, the larger the restricted range is.

The size of the scale of the restricted range is provided below.

In this case, three control attributes include the client IP '10.0.2.2', the server IP '10.0.1.1', and the server 'SSH', and the key value-set of the policy group A is formed by three different values. On the other hand, in the case of one control attribute including the client IP '10.0.2.2', the key value-set of the policy group B is formed by one value. The network flow satisfying the conditions above is determined whether is allowed to be released by the policy group A, and the network flow not satisfying the above conditions is ignored and compared by the other policy groups below. At this time, because the policy group B allows all network flows whose client IP is '10.0.2.2' (one requirement) and the policy group A only allows the network flows whose client IP is '10.0.2.2', server IP is '10.0.1.1', and the server is 'SSH' (three requirements), the restricted range of the policy group B is larger than the policy group A.

For example, the first temporary policy group constrains the restricted range of the allowed service of one NAS server, and said restricted range is smaller than the restricted range of the second temporary policy group that is constrained by the services that all the NAS servers allow (e.g., both the first temporary policy group and the second temporary policy group allows one NAS server to provide same services, such as port 80 and port 443, but the first temporary policy group only relates to the NAS server whose IP address is '10.1.1.1' and the second temporary policy group relates to all the NAS server; that is, the second temporary policy group has larger access control scope than the access control scope of the first temporary policy group. In this situation, the recommended factor value of the first temporary policy group is 0.9, and the recommended factor value of the second temporary policy group is 0.5.

In one embodiment, each temporary policy group is regarded as a subset based on the restricted range affected by each control attribute, and a union of the restricted ranges of all the subsets is obtained as the final restricted range. For example, the control attributes of the temporary policy groups are the NAS server IP and the service. The network control device 110 takes the restricted range formed by the NAS server IP as a first subset, takes the restricted range formed by the service as a second subset, and computes the union of the restricted ranges of the first subset and the second subset to obtain a final restricted range.

In one embodiment, when the recommended factor is the confidential or sensitive level of the temporary policy group, the network control device 110 computes the recommended factor value as follows.

For example, if the policy rules stored in the temporary policy group are related to the client or the server which is an important device (such as the device providing the core service), related to the device which is a high-risk device (such as the server storing sensitive data), or related to the device which connects to the Internet 200 or provides service to the Internet 200, the network control device 110 sets a larger score to the temporary policy group. In one embodiment, the first temporary policy group constrains the server that the AD server allows, and the second temporary policy group constrains the service that the general computer allows. Because the first temporary policy group is related to the more important server (than the second temporary policy group), the recommended factor value of the first temporary policy group is set as 0.7, and the second recommended factor value of the second temporary policy group is set as 0.2 (which is smaller than 0.7).

In one embodiment, when the recommended factor is the temporary policy group involved in management services, out-of-date services, or services with vulnerabilities, the network control device 110 computes the recommended factor value as follows.

In one embodiment, if the service is related to the policy rule involved in management services, out-of-date services, or services with vulnerabilities, the network control device 110 sets a larger group score to the policy group. For example, the first temporary policy group constrains the clients that are allowed to connect to the NAS server through the SSH service, the second temporary policy group constrains the clients that are allowed to connect to the NAS server through the HTTP service. Because the first temporary policy group is related to the more important service (than the second temporary policy group), the recommended factor value of the first temporary policy group is set as 0.8 and the recommended factor value of the second temporary policy group is set as 0.2 (which is small than 0.8).

In one embodiment, the network control device 110 takes one of the recommended factor values (such as the update interval, the restricted range, the confidential or sensitive level, or involved in management services, out-of-date services, or services with vulnerabilities) as the group score. For example, if the recommended factor is the update interval of the temporary policy group and the computed recommended factor value is 0.9, the group score of the temporary policy group is 0.9.

In another embodiment, the network control device 110 integrates all the recommended factor values into the following function to obtain the group score: group score=$(\Pi_i$ recommended factor value$_i)\times100$. For example, considering three recommended factors: the update interval, the restricted range, the confidential or sensitive level, or involvement in management services, out-of-date services, or services with vulnerabilities, so the group scores are set as 0.5, 0.9, and 0.7 respectively. The group scores are substituted into the function, and the result is 31.5, that is, the group score of the temporary policy group is 31.5.

In step S230, if the group score is not greater than the threshold, or the user does not trigger any command generating the recommendation set, the process goes back to step S210 and performs steps of continuously retrieving the multiple key values from the network flow.

In one embodiment, the threshold is 55. As shown in TABLE I, the group scores of the first temporary policy group and the second temporary policy group are 50 and 40 respectively, both are smaller than the threshold, so the process goes back to step S210 of continuously retrieving the multiple key values of the network flows.

In the embodiment, the network control device 110 updates again each temporary policy group of the candidate policy group set, as shown in TABLE II.

TABLE II

| the candidate policy group set after updated Candidate policy group set | |
| --- | --- |
| The first temporary policy group | The second temporary policy group |
| Name: | Name: |
|   Forbid New Service |   10.0.1.1 Forbid New Client |
| Polices: | Polices: |
|   <any, any, 22, allow> |   <10.0.0.1, 10.0.1.1, any, allow> |
|   <any, any, 80, allow> |   <10.0.0.2, 10.0.1.1, any, allow> |
|   <any, any, any, deny> |   <any, 10.0.1.1, any, deny> |
| Score: | Score: |
|   10 |   60 |
| Factors: | Factors: |
|   Last new service seen: |   Last new service seen: |
|   0 days |   14 days |

In step S230, if a determination that the group score of the policy group is greater than the threshold or the user triggers the command generating the recommendation set is positive, step S240 is then performed.

In the embodiment, a new policy rule, i.e., <any, any, 80, allow>, of the first temporary policy group is created, the group score is updated to 10, and the latest policy service that is found is 0 days ago. On the other hand, no policy rules of the second temporary policy group are changed, the group score is updated to 60, and the latest policy service that was found was 14 days ago. Therefore, the group score of the second temporary policy group, 60, is greater than the threshold, 55, and then the process goes to step S240.

In step S240, one or multiple temporary policy groups are selected from the candidate policy group set to form the recommendation set. In one embodiment, the network control device 110 automatically generates the recommendation set according to the group score of each temporary policy group or the temporary policy group(s) selected by the user.

As the embodiment above, the group score of the second temporary policy group is greater than the threshold, so the second temporary policy group is selected as the content of the recommendation set.

In step S250, optimizing the selected temporary policy group(s) and the ACL is performed.

In one embodiment, the network control device 110 optimizes the content of the recommendation set (i.e., the selected temporary policy group(s), such as deactivating a duplicate policy rule of the temporary policy group that is repeated in the ACL), and the network control device 110 optimizes the ACL, such as adding a default setting of the temporary policy group, where the default setting includes a log file setting or an intrusion prevention security (IPS) setting. When any policy rule of the temporary policy group is the same as that of the ACL, the network control device 110 deactivates the same policy rule of the temporary policy group.

In one embodiment, the network control device 110 generates the recommendation set (step S240) in the generation stage Stage_G1 (Time T2) and optimizes the selected temporary policy group and the ACL (step S250).

In step S260, deploying the selected temporary policy group to the ACL is performed.

In one embodiment, the network control device 110 deploys the content of the recommendation set, i.e., the second temporary policy group, to the ACL. For example, the network control device 110 adds the second temporary policy group to a section of the ACL as a regular policy group.

In general, the ACL includes the multiple policy rules (or called "Access Control Entry (ACE)"), and the last policy rule of the ACL is a default rule. The policy rules of the legacy practice do not have any group-based features. Compared with the legacy practice, the disclosure takes the policy group as a unit to add the policy rule of the ACL. Furthermore, the quantity of the regular policy groups of the ACL increases along with the iteration times of above steps.

The policy rule of the ACL includes, classified by the attributes, the allowed-access policy rule(s) and the denied-access policy rule(s). Generally, in the ACL, the last rule is the denied-access policy rule, and others in front of the denied-access policy rule are allowed-access policy rules. In the disclosure, each policy group includes multiple allowed-access policy rules and one denied-access policy rule, and the denied-access policy rule is the last rule of the ACL, making the allowed-access policy rules above enforced. In other words, in the disclosure, the network flow having specific key values is filtered by the policy group. Therefore, when the ACL contains multiple policy groups, the ACL has multiple denied-access policy rules.

In one embodiment, after the temporary policy group is added to the ACL as the regular policy group, the network control device 110 removes the temporary policy group from the candidate policy group set. For example, because the second temporary policy group is added to the ACL, the second temporary policy group is removed from the candidate policy group. After that, the candidate policy group set remains the first temporary policy group. If all the temporary policy groups are eliminated from the candidate policy group set and the candidate policy group set becomes empty, the network control device 110 performs step S270.

In step S270, determining whether the candidate policy group set is an empty set for a period of time is performed.

In one embodiment, if the candidate policy group set is the empty set for a period of time, the network control device 110 completes the process. In other words, the access control list is well-defined at this time to achieve effective network flow filtering. Otherwise, if the determination is negative, the process goes back to step S210.

Reference is made to FIG. 2 and FIG. 3. The learning stage Stage_L is a process which is performed independently, and repeats step S210 and step S220 during Time T1, T2, T3, T4, T5, T6, and so on. On the other hand, the generation stage Stage_G1, Stage_G2, . . . , the deployment stage Stage_D1, Stage_D2, . . . , and so on, are processes which are parallel to the learning stage Stage_L. For example, the network control device 110 performs the generation stage Stage_G1 and the deployment stage Stage_D1 respectively during Time T2 and T3. In the meantime, the network control device 110 performs the learning stage Stage_L which is parallel to the generation stage Stage_G1 and the deployment stage Stage_D1.

In one embodiment, the network control device 110 includes a graphical user interface (GUI). The user may operate the GUI to check the contents of the candidate policy group set. Furthermore, the user may also press a button shown on the GUI to select and deploy the policy group corresponding to the button (step S230).

In one embodiment, each regular policy group of the ACL has a priority. The network control device 110 reorders all the policy groups according to the priority of each regular policy group when adding the regular policy group to the ACL each time (step S260).

As described above, the control attribute is the constant part of the allowed-access policy rules and denied-access policy rules of the policy group in common. The restricted range is associated with the quantity of the multiple key values of the policy group that are enumerated to be the control attribute. The more the control attribute is enumerated, the smaller the restricted range is; otherwise, the less the control attribute is enumerated, the larger the restricted range is. In one embodiment, the policy group that forms the smaller restricted range has a higher priority, i.e., the policy group is disposed on a section close to the top of the ACL. Otherwise, the policy group that forms the larger restriction range has a lower priority, i.e., the policy group is disposed at the section close to the bottom of the ACL.

It should be noted that if the policy group that formed the larger restricted range had the higher priority, the network flow would be filtered by the ACL at the beginning of the filtering. It would make the policy group that forms a smaller restricted range invalid because the priority of the policy group that forms the smaller restricted range is after the priority of the policy group that forms the larger restricted range. Therefore, the network control device 110 reorders the priority of all the policy groups according to the size of the restricted range to construct a hierarchical filtering effect from top to bottom of the multiple policy groups of the ACL.

In one embodiment, after generating the well-defined ACL, the network control device 110 compares a test network flow according to the priority of the multiple regular policy groups of the ACL. When the key value-set of the test network flow matches the policy rule of the ACL, the network control device 110 determines whether the test network flow should be released according to the attribute of the policy rule which is allowed-access or denied-access. For example, if the key value-set of the test network flow satisfies the allowed-access policy rule, the network control device 110 allows the test network flow to pass; if the key value-set of the test network flow satisfies the denied-access policy rule, the network control device 110 blocks the test network flow.

Figure 4:
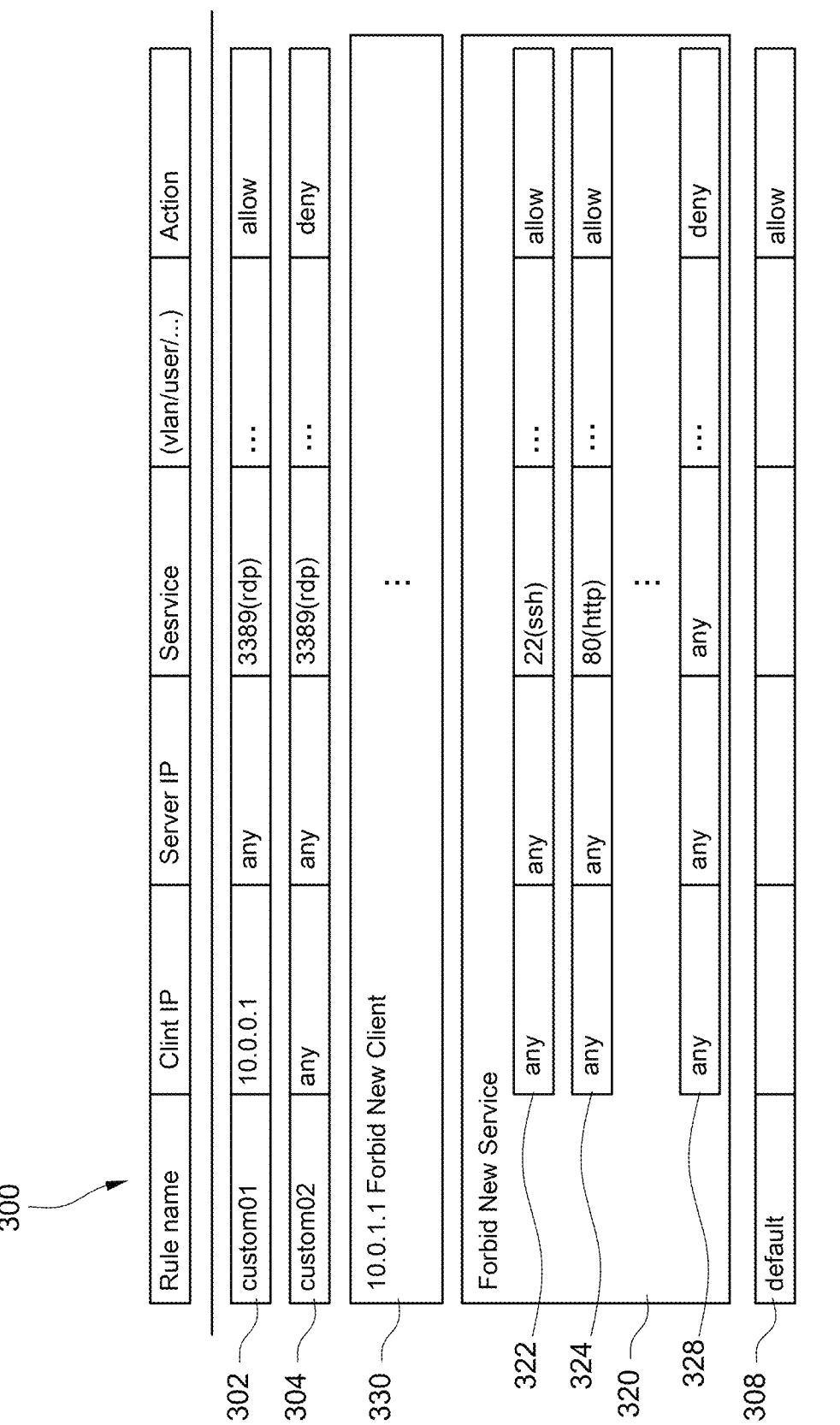
FIG. 4 is a schematic diagram of an access control list according to one embodiment of the disclosure.

Reference is made to FIG. 4. FIG. 4 is a schematic diagram of an access control list (ACL) according to one embodiment of the disclosure.

The ACL 300 includes policy rules 302, 304, and 308. The policy rule 308 is a default rule of the ACL in a global domain. The policy rules 302, 304, and 308 may be manually added by the information management personnel. For example, the policy rule 302 the information of the rule name 'custom01', the client IP '10.0.0.1', the server IP 'any', the service '3389(rdp)', the action 'allow', and the vlan/user.

The ACL 300 includes the regular policy groups 320 and 330. The regular policy group 330 is added during some particular time (such as Time T3) after the network control device 110 refers to the temporary policy group of the candidate policy group set. In the embodiment, the regular policy group 320 is applied to the group that focuses on specific service(s) (e.g., the services ssh and http are allowed).

Furthermore, the network control device 110 computes the priority according to the restricted range of the regular policy group 320 and the regular policy group 330. In the embodiment, the restricted range of the regular policy group 330 is smaller than the restricted range of the regular policy group 320, so the priority of the regular policy group 330 is higher than the priority of the regular policy group 320.

The regular policy group 320 includes, at least, the policy rules 322 and 324 which are allowed-access policy rules and the policy rule 328 which is the denied-access policy rule.

In the embodiment of the policy group 320, the allowed-access policy rule is applied to constrain the available service(s). In other words, as any client using the service that is not listed on the allowed-access list to access the server, the network flow is blocked. Therefore, the network control device 110 sets the policy rule 328 of the regular policy group 320 to block all the clients from accessing all services, making the services that are not allowed excluded from the regular policy group 320. In the embodiment, the policy rule 328 is the default policy of the regular policy group 320.

When receiving an unknown network flow (or called "test network flow"), the network control device 110 analyzes information (such as the server IP 10.0.2.2, the client IP 10.0.3.3, and the service SSH) of the multiple key values (such as the server IP, the client IP, and the service) of the network flow and aggregates the information as the key value-set, so key value-set may be compared with the ACL 300. In the comparison, the network control device 110 compares the key value-set with the ACL 300, one by one from the first policy rule of the first policy group (such as the regular policy group 330) to the second policy rule and so on. If there are no policy rules of the regular policy group 330 satisfying the key value-set, all the policy rules of the second policy group (such as the regular policy group 320) are compared with the key value-set.

The ACL includes the multiple allowed-access and denied-access policy rules. If one allowed-access policy rule satisfies the key value-set, the network control device 110 allows the received network flow. Otherwise, if the key value-set satisfies the denied-access policy rule, and then the network control device 110 blocks the received network flow.

It should be noted that because the network control device 110 reorders all the policy groups according to the priority of each policy group, and the priority of the policy group having a smaller restricted range is higher than the priority of the policy group having a larger restricted range, the comparison step of filtering the network flow may be started from the policy group having the small restricted range, i.e., from the higher priority.

Figure 5:
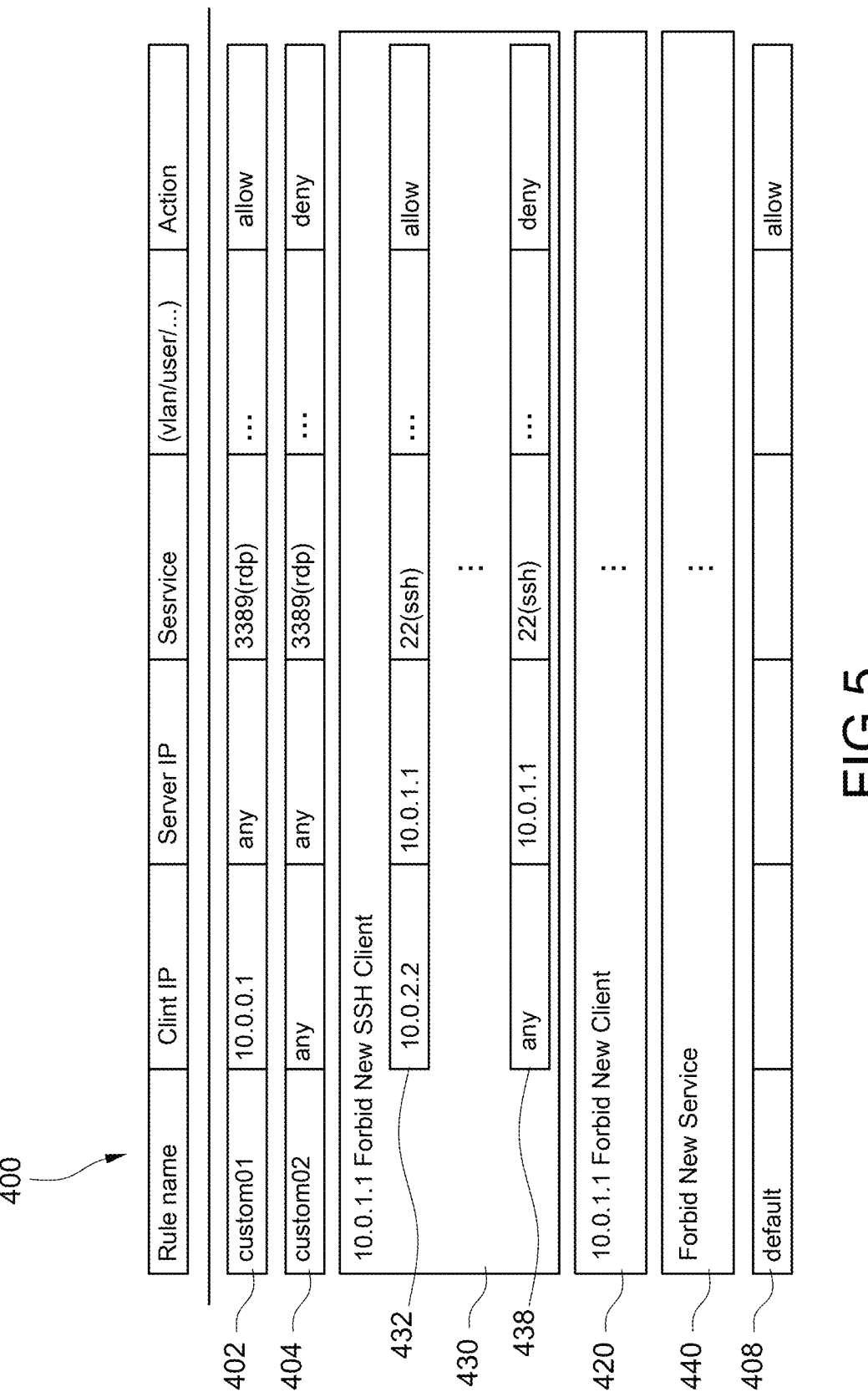
FIG. 5 is a schematic diagram of the access control list according to the other embodiment of the disclosure.

FIG. 5 is a schematic diagram of the access control list (ACL) according to the other embodiment of the disclosure.

As shown in FIG. 5, the ACL 400 includes the policy rules 402, 404, and 408.

ACL 400 further includes the regular policy groups 420, 430, and 440. The regular policy group 430 is added during some particular time (such as Time T6) after the network control device 110 refers to the temporary policy group of the candidate policy group set. In the embodiment, after a period of time, the ACL 300 is updated and then the ACL 400 is obtained.

The establishment order of the three regular policy groups of the ACL 400 is the regular policy group 420, the regular policy group 440, and the regular policy group 430. The regular policy group 420 of the ACL 400 may be the regular policy group 330 of the ACL 300 (FIG. 3); the regular policy group 440 may be the regular policy group 320 of the ACL 300 (FIG. 3).

In the embodiment, the regular policy group 430 is applied to constrain some specific clients using the service SSH.

When receiving an unknown network flow (or called "test network flow"), the network control device 110 analyzes the information of the multiple key values of the network flow, integrates the information as the key value-set, and compares the key value-set with the ACL 400. In the comparison, the network control device 110 compares the key value-set with the ACL 400, one by one from the first policy rule (such as the policy rule 432) of the first policy group (such as the regular policy group 430). If there are no policy rules of the regular policy group 430 satisfying the key value-set, the policy rules of the second policy group (such as the regular policy group 420) and then the third policy group (such as the regular policy group 440) are compared with the key value-set.

If the key value-set satisfies the allowed-access policy rule, the network control device 110 allows the network flow. Otherwise, if the key value-set satisfies the denied-access policy rule, and then the network control device 110 blocks the received network flow.

Figure 6:
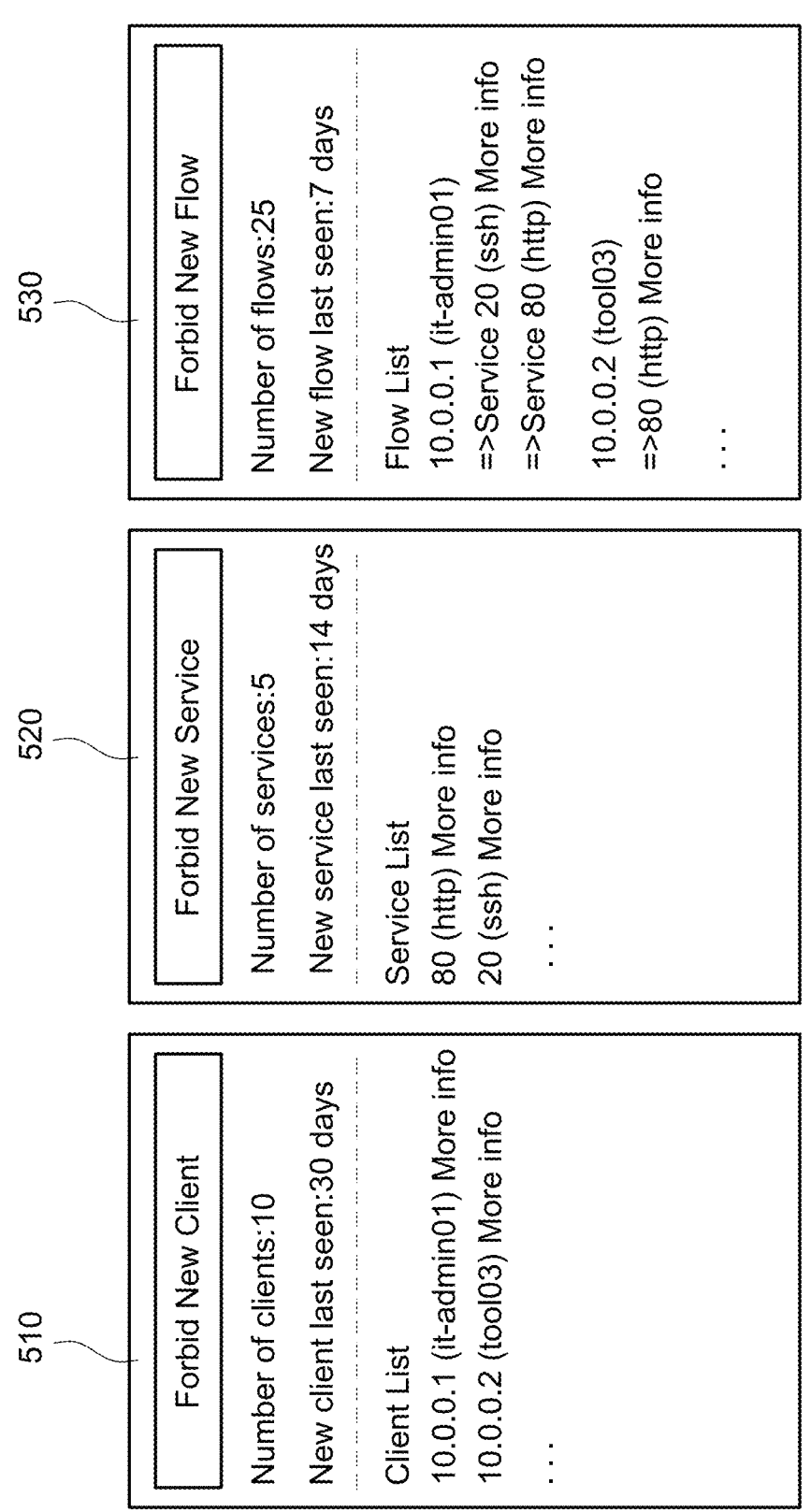
FIG. 6 illustrates examples of network activity histories according to different embodiments of the present disclosure.

FIG. 6 illustrates examples of network activity histories according to different embodiments of the present disclosure. The network control device 110 stores all network flow activities of the shared network 100 to the network activity histories. In one embodiment, the network activity history includes the information of one or multiple key values.

In one embodiment, the network activity history 510 the information of monitoring the client. In the network activity history 510, the network control device 110 monitors the quantity of the clients that access the specific servers of the shared network 100 is 10, and the new client accesses the specific server (a new access event) of the shared network 100 the most recently found is 30 days ago. Therefore, the network control device 110 generates a policy group including the policy rule allowing the 10 clients to access and one denied-access policy rule to constrain any other clients to access the specific server, and computes/updates the group score of the policy group according to the recommended factor.

In one embodiment, the network activity history 520 is the information of monitoring the service. In the network activity history 520, the network control device 110 monitors the quantity of the servers in operation in the shared network 100 is 5, and the new service operating in the shared network 100 the most recently found was 14 days ago. Therefore, the network control device 110 generates a policy group including the policy rule allowing the 5 services in operation and one denied-access policy rule to constrain any clients to access the specific server, and updates the group score of the policy group.

In one embodiment, the network activity history 530 is the information of monitoring the network flow. The network flow includes the client IP, the service (port number), and the server IP. In the network activity history 530, the network control device 110 monitors the quantity of the network flows in the shared network 100 is 25, and the new (unknown) network flow monitored in the shared network 100 the most recently found was 7 days ago. Therefore, the network control device 110 generates a policy group including the policy rule allowing the 25 network flows passing through and one denied-access policy rule to constrain any clients to access the specific server by any service (port number), and updates the group score of the policy group.

In summary, the incremental micro-segmentation system and the incremental micro-segmentation method provided in the disclosure deploy appropriate policy groups based on the current network conditions or environmental requirements, achieving local protections within the global network environment. The quantity of deployed policy groups is gradually increased, that is, the range of local protections to different protection parts is extended, so gradually enhancing the global network protection coverages is achieved.

Considering existing operations of the access control list, that require a longer time to train an access control list, which cannot be applied to block unauthorized network flows during the training period and lead to a protection gap. The incremental micro-segmentation system and method in the disclosure repeatedly updates the candidate policy group set, that is, updates the local protections of the access control list in different phases or segments, to reduce the window period between the learning stage to the deployment stage of the prior art features. By reducing the time between the learning stage fast learning the access control rules locally and the deployment stage that the ACL is deployed in the shared network 100, the fast and effective security protection mechanism is established.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An incremental micro-segmentation system, comprising:

a shared network, wherein multiple network assets are deployed in the shared network; and a network control device, authorized to monitor the shared network and perform in a learning stage being parallel to a generating stage and a deployment stage, the network control device comprises a hardware processor and the hardware processor is configured to:

retrieve multiple key values from a network flow in the learning stage;

based on an interested attribute of one or multiple temporary policy groups of a candidate policy group set that is not enforced, add the multiple key values to be a policy rule of the one or multiple temporary policy groups, and different combinations of the multiple key values form different policy rules;

compute a group score of each of the temporary policy groups according to a recommended factor value, wherein each recommended factor value being independently computed based on a state of respective temporary policy group with respect to corresponding recommended factors taken from the group of: update interval, restricted range, confidential or sensitive level, involvement in management services, out-of-date services, or services with vulnerabilities;

when determining that the group score is greater than a threshold, generate a recommendation set comprising the one or multiple temporary policy groups in the generation stage; and deploy the recommendation set to an access control list in the deployment stage to make content of the one or multiple temporary policy groups be enforced, wherein the temporary policy groups of the candidate policy group set are not added to the access control list before the deployment stage is performed;

wherein a regular policy group in the access control list has a priority, and the network control device is configured to:

when adding the one or multiple temporary policy groups to the regular policy group of the access control list each time, reorder all the regular policy groups of the access control list according to the priority.

2. The incremental micro-segmentation system of claim 1, wherein the interested attribute comprises a control attribute and an observation attribute, and the network control device is configured to, based on the multiple key values indicated by the control attribute and the multiple key values listed by the observation attribute, take the multiple key values as a key value-set by referring to the interested attribute of the one or multiple temporary policy groups, and add the key value-set to the policy rule of the one or multiple temporary policy groups.

3. The incremental micro-segmentation system of claim 1, after generating the recommendation set comprising the one or multiple temporary policy groups, the network control device is configured to:

perform a process for optimizing content of the recommendation set, wherein the process comprises deactivating a duplicate policy rule of the one or multiple temporary policy group that is repeated in the access control list; and perform the process for optimizing the one or multiple temporary policy groups, wherein the process comprises adding a default setting to the one or multiple temporary policy groups, and the default setting comprises a log file setting or an intrusion prevention security (IPS) setting.

4. The incremental micro-segmentation system of claim 1, wherein the network control device deploys the recommendation set to the access control list further comprises:

adding the one or multiple temporary policy groups whose group score is greater than the threshold to a section of the access control list as the regular policy group; and removing the one or multiple temporary policy groups that are added to the access control list from the candidate policy group set.

5. The incremental micro-segmentation system of claim 4, wherein the network control device is configured to:

compute a restricted range of all the regular policy groups of the access control list; and set a high priority to a small restricted range and set a low priority to a large restricted range.

6. The incremental micro-segmentation system of claim 4, after removing the one or multiple temporary policy groups from the candidate policy group set, the network control device is configured to:

determine whether the candidate policy group set is empty and remains for a period of time; and when the candidate policy group set is empty and remains for the period of time, determine that the access control list is well-defined.

7. The incremental micro-segmentation system of claim 6, after determining that the access control list is well-defined, the network control device is configured to:

inspect a test network flow with the regular policy groups by the priority of the regular policy groups of the access control list; and when determining that a key value-set of the test network flow matches the policy rule of the access control list, allow or block the test network flow based on an attribute of the policy rule that is allowed-access or denied-access.

8. The incremental micro-segmentation system of claim 1, wherein the key value comprises a client IP address, a server IP address, a service, or a port number.

9. An incremental micro-segmentation method, performed by a network control device authorized to monitor a shared network, wherein the network control device performs in a learning stage being parallel to a generation stage and a deployment stage, the incremental micro-segmentation method comprising:

retrieving multiple key values from a network flow in the learning stage;

based on an interested attribute of one or multiple temporary policy groups of a candidate policy group set that is not enforced, adding the multiple key values to be a policy rule of the one or multiple temporary policy groups, and different combinations of the multiple key values form different policy rules;

computing a group score of each of the temporary policy groups according to a recommended factor value, wherein each recommended factor value being independently computed based on a state of respective temporary policy group with respect to corresponding recommended factors taken from a group of: update interval, restricted range, confidential or sensitive level, involvement in management services, out-of-date services, or services with vulnerabilities;

when determining that the group score is greater than a threshold, generating a recommendation set comprising the one or multiple temporary policy groups in the generation stage; and deploying the recommendation set to an access control list in the deployment stage to make content of the one or multiple temporary policy groups be enforced, wherein the temporary policy groups of the candidate policy group set are not added to the access control list before the deployment stage is performed;

wherein a regular policy group in the access control list has a priority, and the incremental micro-segmentation method further comprises:

when adding the one or multiple temporary policy groups to the regular policy group of the access control list each time, reordering all the regular policy groups of the access control list according to the priority.

10. The incremental micro-segmentation method of claim 9, wherein the interested attribute comprises a control attribute and an observation attribute, and the incremental micro-segmentation method further comprises: based on the multiple key values indicated by the control attribute and listed by the observation attribute, taking the multiple key values as a key value-set by referring to the interested attribute of the one or multiple temporary policy groups and adding the key value-set to the policy rule of the one or multiple temporary policy groups.

11. The incremental micro-segmentation method of claim 9, after generating the recommendation set comprising the one or multiple temporary policy groups, further comprising:

performing a process for optimizing content of the recommendation set, wherein the process comprises deactivating a duplicate policy rule of the one or multiple temporary policy groups that are repeated in the access control list; and performing the process for optimizing the one or multiple temporary policy groups, wherein the process comprises adding a default setting to the one or multiple temporary policy groups, and the default setting comprises a log file setting or an intrusion prevention security (IPS) setting.

12. The incremental micro-segmentation method of claim 9, wherein a step of deploying the recommendation set to the access control list comprises:

adding the one or multiple temporary policy groups whose group score is greater than the threshold to a section of the access control list as the regular policy group; and removing the one or multiple temporary policy groups that are added to the access control list from the candidate policy group set.

13. The incremental micro-segmentation method of claim 12, further comprising:

computing a restricted range of all the regular policy groups of the access control list respectively; and setting a high priority to a small restricted range and setting a low priority to a large restricted range.

14. The incremental micro-segmentation method of claim 12, after removing the one or multiple temporary policy groups from the candidate policy group set, further comprising:

determining whether the candidate policy group set is empty and remains for a period of time; and when the candidate policy group set is empty and remains for the period of time, determining that the access control list is well-defined.

15. The incremental micro-segmentation method of claim 14, after determining that the access control list is well-defined, further comprising:

inspecting a test network flow with the regular policy groups by the priority of the regular policy groups of the access control list;

when determining that a key value-set of the test network flow matches the policy rule of the access control list, allowing or blocking the test network flow based on an attribute of the policy rule that is allowed-access or denied-access.

16. The incremental micro-segmentation method of claim 9, wherein the key value comprises a client IP address, a server IP address, a service, or a port number.

\* \* \* \* \*